United States Patent
Park et al.

(10) Patent No.: US 9,183,149 B2
(45) Date of Patent: Nov. 10, 2015

(54) MULTIPROCESSOR SYSTEM AND METHOD FOR MANAGING CACHE MEMORY THEREOF

(71) Applicant: SAMSUNG ELECTRONICS CO., LTD., Suwon-si, Gyeonggi-do (KR)

(72) Inventors: Il Park, Seoul (KR); Young Pyo Joo, Seoul (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 306 days.

(21) Appl. No.: 13/793,023

(22) Filed: Mar. 11, 2013

(65) Prior Publication Data

US 2013/0275686 A1    Oct. 17, 2013

(30) Foreign Application Priority Data

Apr. 17, 2012 (KR) .................. 10-2012-0039804

(51) Int. Cl.
*G06F 12/00* (2006.01)
*G06F 12/08* (2006.01)

(52) U.S. Cl.
CPC .................................. G06F 12/0831 (2013.01)

(58) Field of Classification Search
CPC .................................................. G06F 12/0831
See application file for complete search history.

(56) References Cited

U.S. PATENT DOCUMENTS

| | | | |
|---|---|---|---|
| 5,890,217 A | 3/1999 | Kabemoto et al. | |
| 6,021,472 A | 2/2000 | Hamaguchi et al. | |
| 6,993,633 B1 | 1/2006 | Sakakibara et al. | |
| 7,484,044 B2 | 1/2009 | Gilbert et al. | |
| 7,519,780 B2 | 4/2009 | DeMent et al. | |
| 7,546,422 B2 | 6/2009 | George et al. | |
| 7,783,840 B2 | 8/2010 | Hataida et al. | |
| 2006/0190661 A1* | 8/2006 | Ogilvie et al. | 710/310 |

FOREIGN PATENT DOCUMENTS

| | | |
|---|---|---|
| JP | 06-208507 | 7/1994 |
| JP | 2000-250811 | 9/2000 |
| JP | 2001-034597 | 2/2001 |
| KR | 1020000052193 | 8/2000 |

* cited by examiner

*Primary Examiner* — John Lane
(74) *Attorney, Agent, or Firm* — F. Chau & Associates, LLC

(57) ABSTRACT

A multiprocessor system includes a plurality of master devices, at least one slave device, and a system bus connecting the master devices to the at least one slave device. At least one of the master devices includes at least one cache memory, and the system bus processes a data write or data read request corresponding a transaction issued to the slave device from at least one of the master devices prior to termination of a snooping operation on the master devices.

20 Claims, 7 Drawing Sheets

MULTIPROCESSOR SYSTEM AND METHOD FOR MANAGING CACHE MEMORY THEREOF

CROSS-REFERENCE TO RELATED APPLICATIONS

This US non-provisional patent application claims priority under 35 USC §119 to Korean Patent Application No. 10-2012-0039804, filed on Apr. 17, 2012, the disclosure of which is incorporated by reference herein.

BACKGROUND

1. Technical Field

The inventive concept is directed to multiprocessor systems and methods for managing a cache memory thereof.

2. Discussion of Related Art

In a typical computing system, a processor reads data from an external memory and stores the read data in a cache memory. When the processor executes operations using the read data, the processor reads the read data not from the external memory, but from the cache memory. Use of the cache memory allows commands to be executed at higher speed because access between the processor and the external memory has a higher latency than access between the processor and the cache memory.

A multiprocessor-based system include several processors, where each processor includes a cache memory. In recent years, multiprocessor-based systems have been introduced in not only high-performance systems such as servers and personal computers (PCs) but also mobile devices. However, since mobile device typically make use of hardware accelerators to a larger extent than other devices, they may have trouble maintaining cache coherency. Further, inconsistent caches in mobile devices may have a significant effect on system performance.

SUMMARY OF THE INVENTION

According to an exemplary embodiment of the inventive concept, a multiprocessor system includes a plurality of master devices, at least one slave device, and a system bus. At least one of the master devices includes at least one cache memory. The system bus connects the master devices to the at least one slave device. The system bus processes a data write or data read request corresponding to a transaction issued to the slave device from at least one of the master devices prior to termination of a snooping operation on the master devices.

In an exemplary embodiment, if the transaction is a write transaction, the system bus may write data corresponding to the write transaction into the slave device while performing a snooping operation corresponding to the write transaction on the cache memory of the master devices.

In an exemplary embodiment, the system bus may include a plurality of slave interfaces receiving the transaction from a corresponding one of the master devices and decoding an address corresponding to the slave device, a master interface receiving the transaction from the slave interface and granting an access right to the slave device to one of the master devices, and a snoop router performing a snooping operation on the master devices, based on a snoop control signal received from the master interface.

In an exemplary embodiment, if the transaction is a write transaction, the master interface may write data corresponding to the write transaction into the slave device and transmit the snoop control signal to the snoop router.

In an exemplary embodiment, the master interface may write data corresponding to the write transaction into the slave device and then or simultaneously transmit the snoop control signal to the snoop router.

In an exemplary embodiment, the transaction may be a write transaction or a read transaction. In an exemplary embodiment, if the transaction is a write transaction and there is valid data in the cache memory of a master device from which the transaction is not issued among the master devices, the snoop router may invalidate the valid data when the write data corresponding to the write transaction is full-line data, and merge the valid data with the write data and transmit the merged data to the master interface when the write data is partial-line data.

In an exemplary embodiment, if the transaction is a write transaction, the master interface may overwrite the merged data into the slave device.

In an exemplary embodiment, if the transaction is a write transaction, the snoop router may terminate processing of the write transaction when there is no valid data in the cache memory of a master device from which the write transaction is not issued among the master devices.

In an exemplary embodiment, if the transaction is a read transaction, the system bus may read read data corresponding to the read transaction from the slave device and then or simultaneously perform a snooping operation corresponding to the read transaction on the master devices.

According to an exemplary embodiment of the inventive concept, a method of managing a cache memory of a multiprocessor system includes issuing a transaction to a slave device of the system from at least one of a plurality of master devices of the system, processing, by a system bus of the system, a data read or data write request corresponding to the transaction, and snooping, by the system bus, the master device from which the transaction is not issued among the master devices. The processing of the data read or data write request is performed prior to termination of the snooping of the master device. The processing of the data read may refer to reading data associated with the read request from the slave device and the processing of the data write may refer to writing data of the write request to the slave device. The master devices may share the slave device through the system bus.

In an exemplary embodiment, if the transaction is a write transaction, the processing of the data write request writes write data from the write transaction into the slave device.

In an exemplary embodiment, the snooping of the master device determines whether valid data is present in the corresponding master device (e.g., another master device except for the one that issued the transaction).

In an example embodiment, the cache management method may further include determining whether the write data is full-line data or partial-line data when there is the valid data.

In an example embodiment, the cache management method may further include invalidating the valid data when the write data is full-line data; merging the write data with the valid data when the valid data is partial-line data; and overwriting merged data obtained by merging the write data and the valid data and invalidating the valid data.

In an exemplary embodiment, if the transaction is a read transaction, the processing of the data read request reads read data corresponding to the read transaction from the slave device.

According to an exemplary embodiment of the inventive concept, a method of managing a cache memory of a system by a system bus of the system includes receiving by the system bus, a write request from a first master device of the system, writing by the system bus, first data of the write request to the slave device, after the writing, determining by the system bus, whether second data corresponding to the first data is present within the cache memory of second master device of the system, and marking by the system bus, the present data in the cache memory as invalid.

The second data corresponding to the first data may be present when an address of the write request is the same as an address in the cache memory associated with the second data. The marking may include marking an entire cache line of the cache memory corresponding to the second data invalid when the first data is a size of a cache line of the cache memory, and merging the second data with the first data and marking only a portion of a cache line of the cache memory corresponding to the second data invalid when the first data is smaller than the cache line. The method may further include overwriting by the system bus, data of the slave device with the merged data. The marking may include changing a value of a register in the second master device associated with the present data.

DETAILED DESCRIPTION

Figure 1:
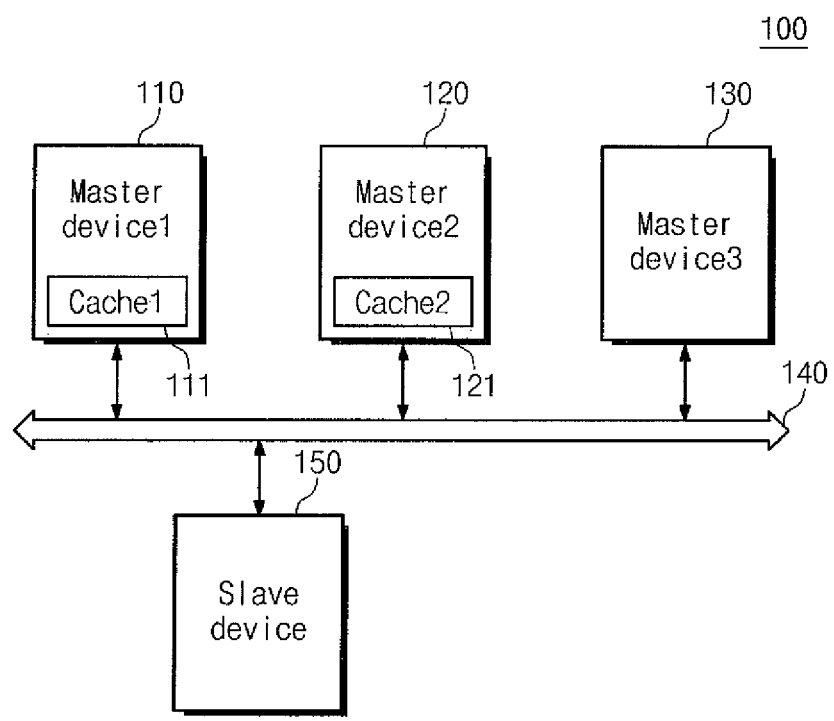
FIG. 1 is a block diagram of a multiprocessor system according to an exemplary embodiment of the inventive concept.

The inventive concept will now be described more fully hereinafter with reference to the accompanying drawings, in which exemplary embodiments of the inventive concept are shown. The inventive concept may, however, be embodied in many different forms and should not be construed as limited to the embodiments set forth herein. Like reference numerals refer to like elements throughout.

It will be understood that when an element is referred to as being "on" another element, it can be directly on the other element or intervening elements may be present therebetween. As used herein, the singular forms "a", "an" and "the" are intended to include the plural forms as well, unless the context clearly indicates otherwise. Hereinafter, the inventive concept will now be described in detail with reference to the accompanying drawings.

Reference is made to FIG. 1, which is a block diagram of a multiprocessor system 100 according to an exemplary embodiment of the inventive concept. The multiprocessor system 100 includes a first master device 110, a second master device 120, a third master device 130, a system bus 140, and a slave device 150.

In an exemplary embodiment, a master device is a device controlling another device, while a slave device is a device controlled by another device. The number of master and slave devices illustrated in FIG. 1 is merely an example, as the inventive concept is not limited thereto.

In an exemplary embodiment, the first master device 110, the second master device 120, and the third master device 130 are each processors. The first master device 110 may be, for example, a central processing unit (CPU). The second master device 120 may be, for example, a graphic processing unit (GPU). The third master device 130 may be, for example, a direct memory access (DMA) unit.

In an exemplary embodiment, the first master device 110 includes a first cache memory 111, and the second master device 120 includes a second cache memory 121. Optionally, the third master device 130 may also include a cache memory. In an exemplary embodiment, the first cache memory 111 and the second cache memory 121 include a level 1 cache (L1 Cache) memory and a level 2 cache (L2 Cache) memory, respectively.

The first cache memory 111 and the second cache memory 121 store data in units of cache lines. For example, each cache line may be 32 bytes, 64 bytes or 128 bytes and is not limited thereto.

In an exemplary embodiment, the slave device 150 is a memory device such as a random-access memory (RAM), a read-only memory (ROM), and a synchronous dynamic RAM (SDRAM) or an input/output (110) device. Hereinafter, it will be explained that the slave device 150 is a memory device. For example, the slave device 150 may include a memory controller and a memory. The memory may be a nonvolatile memory (e.g., a dynamic RAM (DRAM)).

The first master device 110, the second master device 120, and the third master device 130 are connected to the slave device 150 through the system bus 140. For example, the first master device 110, the second master device 120, and the third master device 130 may be connected to the slave device 150 through a single system bus. That is, the first master device 110, the second master device 120, and the third master device 130 share the system bus 140 to access the slave device 150. The system bus 140 may include a plurality of layers.

At least one of the first to third master devices 110, 120, and 130 issues a transaction to access the slave device 150. The transaction may be, for example, a write transaction or a read transaction. In an exemplary embodiment, a transaction is a computer message that is sent from a source device (e.g., a master device) across the system bus 140 to the device that is to be accessed (e.g., slave device). Since the first master device 110, the second master device 120, and the third master device 130 write data into the slave device 150 through the system bus 140 or read data from the slave device 150 through the system bus 140, the multiprocessor system 100 may be referred to as a shared memory system.

Issue of cache coherency may arise in the multiprocessor system 100. For example, when the first master device 110 issues a write transaction to write first data into the slave device 150, there may be a mismatch between the first data and second data stored in the second cache memory 121 of the second master device 120. For example, if the second cache memory 121 of the second master device 120 retained a copy of the contents (e.g., the second data) of a variable in the slave device 150 before it was updated in the first cache memory 111 with the first data, this copy would be inconsistent with the variable unless it is also updated or marked as invalid. The first data and the second data may be correlated with each other through an address. For example, an address may be used to ensure that the first data and the second data are consistent with another.

In an exemplary embodiment, when a transaction (e.g., write, read, etc.) is issued from at least one of the first to third master devices 110, 120, and 130, the system bus 140 processes a data read or write request corresponding to a transaction prior to termination of a snooping operation on the other master device except for the master device that issues the transaction. In an exemplary embodiment, the system bus 140 processes a read request by reading data associated with the read request from the slave device (e.g., 150). In an exemplary embodiment, the system bus 140 processes a write request by writing data of the write request into the slave device. For example, processing of a read request may indicate that a read operation actually completed and processing of write request may indicate that a write operation actually completed.

For example, let it be assumed that a write transaction is issued from the first master device 110. In this case, the system bus 140 writes data corresponding to the write transaction (hereinafter referred to as "write data") into the slave device 150 and starts a snooping operation on the other master devices. The snooping operation may be started prior to processing of a data read or data write request corresponding to the transaction. Alternatively, the snooping operation may be started following processing of a data read or data write request corresponding to the transaction. However, even in these cases, the system bus 140 processes the data read or data write request corresponding to the transaction prior to termination of the snooping operation.

In an exemplary embodiment of the inventive concept, the snooping operation is an operation that determines whether valid data is present in a cache memory of the other master devices. The valid data may refer to data stored in a cache memory area of another master device and related with data corresponding to a transaction through an address. In an exemplary embodiment, the valid data is present in the cache memory when its associated address in the cache memory is the same as an address associated with the write or read request.

Thus, the multiprocessor system 100 may reduce a write latency or a read latency while retaining cache coherency. In an exemplary embodiment, the write latency refers to a waiting time until write data is written according to issuance of a write transaction, and the read latency refers to a waiting time until read data is read according to issuance of a read transaction. This will be described below in detail with reference to FIGS. 2 and 3.

Figure 2:
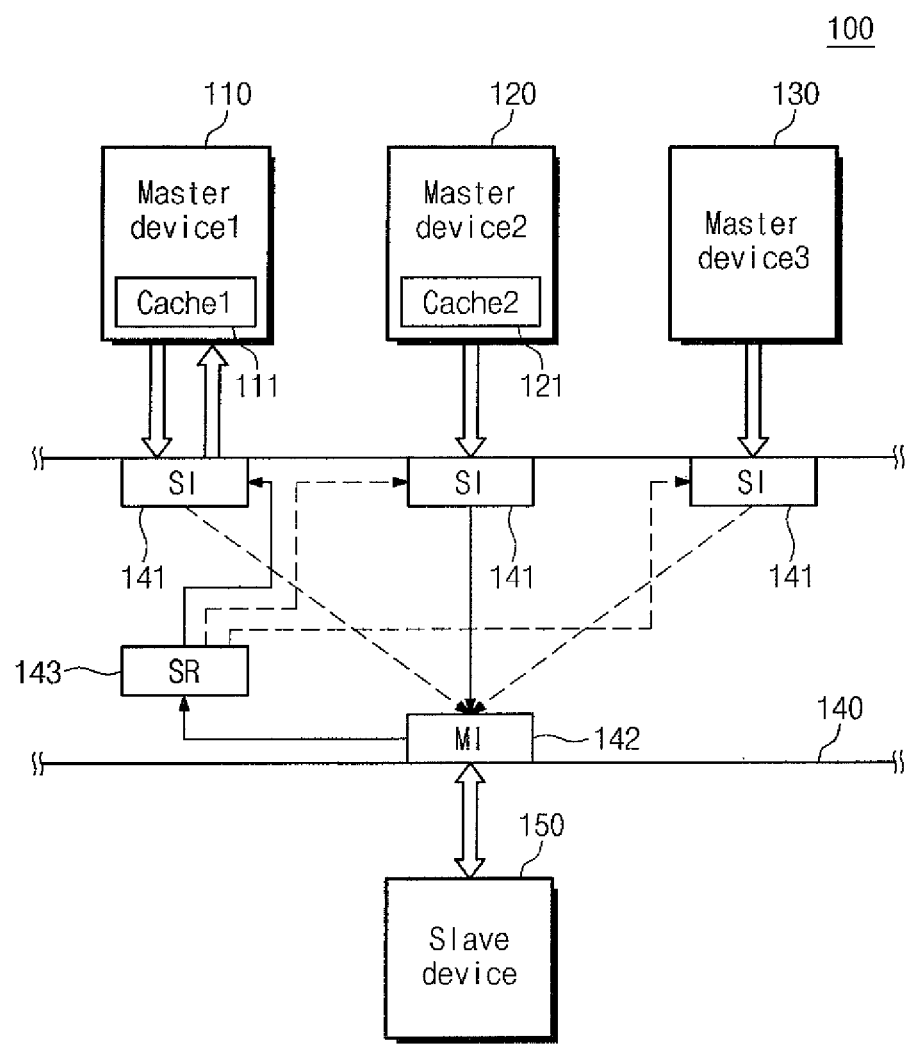
FIG. 2 is a detailed block diagram of a multiprocessor system according to an exemplary embodiment of the inventive concept.

Reference is made to FIG. 2, which is a detailed block diagram of a multiprocessor system 100 according to an exemplary embodiment of the inventive concept.

Let it be assumed that the first master device 110 snoops another master device and may be snooped by another master device. Let it be assumed that the second master device 120 and the third master device 130 cannot be snooped by the first master device 110. Further, let it be assumed that the second master device 120 issues a write transaction.

As illustrated, a system bus 140 of the multiprocessor system 100 includes a plurality of slave interfaces 141, a master interface 142, and a snoop router 143.

The slave interfaces 141, the master interface 142, and the snoop router 143 may each include a logic circuit. The number of the slave interfaces 141 may vary depending on the number of the master devices 110, 120, and 130.

The slave interface 141 decodes an address of the slave device 150 that the corresponding first, second or third master device 110, 120 or 130 desires to access.

The master interface 142 permits the first, second, and third master devices 110, 120, and 130 to access the slave device 150. For example, the master interface 142 receives addresses of the master devices 110, 120, and 130 from the slave interfaces 141 and permits one of the master devices (e.g., the second master device 120) to access the slave device 150. For example, when a master device wants to access a slave device, it can communicate its address (e.g., the master device address) and the address of the slave device to a corresponding slave interface. In an exemplary embodiment, the master interface 142 grants access to one of the master devices.

In addition, the master interface 142 processes a data read or write request corresponding to a transaction from the access-permitted master device (e.g., the second master device 120). For example, when receiving a write transaction issued from the second master device 120, the master interface 142 controls write data to be written into the slave device 150.

The snoop router 143 receives a snoop control signal from the master interface 142. The snoop router 143 snoops master devices, based on the snoop control signal. For example, the snoop router 143 snoops the first master device 110 or the first cache memory 111 of the first master device 110.

The snoop router 143 may receive data information corresponding to the transaction from the master interface 142. For example, the snoop router 143 receives information on whether the write data from the master interface 142 is full-line data or partial-line data, from the master interface 142. The full-line data refers to data in units of cache lines, and the partial-line data refers to data in units smaller than a single cache line. For example, when a unit of a cache line is 64 bytes, full-line data can be 64 bytes, 128 bytes, etc., and partial-line data is less than 64 bytes.

A snooping result of the snoop router 143 may be classified into a Snoop Hit or a Snoop Miss. The Snoop Hit indicates there is valid data in the first cache memory 111, while the Snoop Miss indicates invalid data in the first cache memory 111. In an exemplary embodiment, each master device includes a register, latch, or other storage device that retains a state of data in its respective cache. For example, a part of the register may be set (marked) to one value to indicate the data is valid and a second to other value to indicate the data is invalid. When data is valid, it is consistent a copy in the slave device. When data is invalid it is inconsistent with a copy in the slave device. Further, when the data is marked as being invalid in a master device, the master device cannot use this data and needs to either retrieve a valid copy from another master device or the slave device.

In case of a Snoop Hit, the snoop router 143 invalidates valid data when write data is full-line data. That is, the snoop router 143 invalidates a cache line of the first cache memory 111 in which valid data is stored. For example, invalidating the cache line may refer to marking or setting a register associated with the cache line to a value indicating the line is invalid. The snoop router 143 merges write data with valid data of the first cache memory 111 when the write data is partial-line data. The merging may include appending the valid data after the write data or appending the write data after the valid data. The snoop router 143 transmits the merged data to the master interface 142. The master interface 142 controls the merged data to be overwritten into the slave device 150.

In case of a Snoop Miss, the snoop router 143 completes a processing operation of data corresponding to a write transaction. In an exemplary embodiment, completing a processing operation may refer to actually writing data of the write transaction into the slave device.

When a transaction (e.g., write, read, etc.) is issued from the master devices 110, 120 or 130, the multiprocessor system 100 processes a data read or data write request corresponding to the transaction prior to termination of a snooping operation on another master device 110. Thus, the multiprocessor system 100 may reduce a write latency or a read latency while retaining cache coherency.

Figure 3:
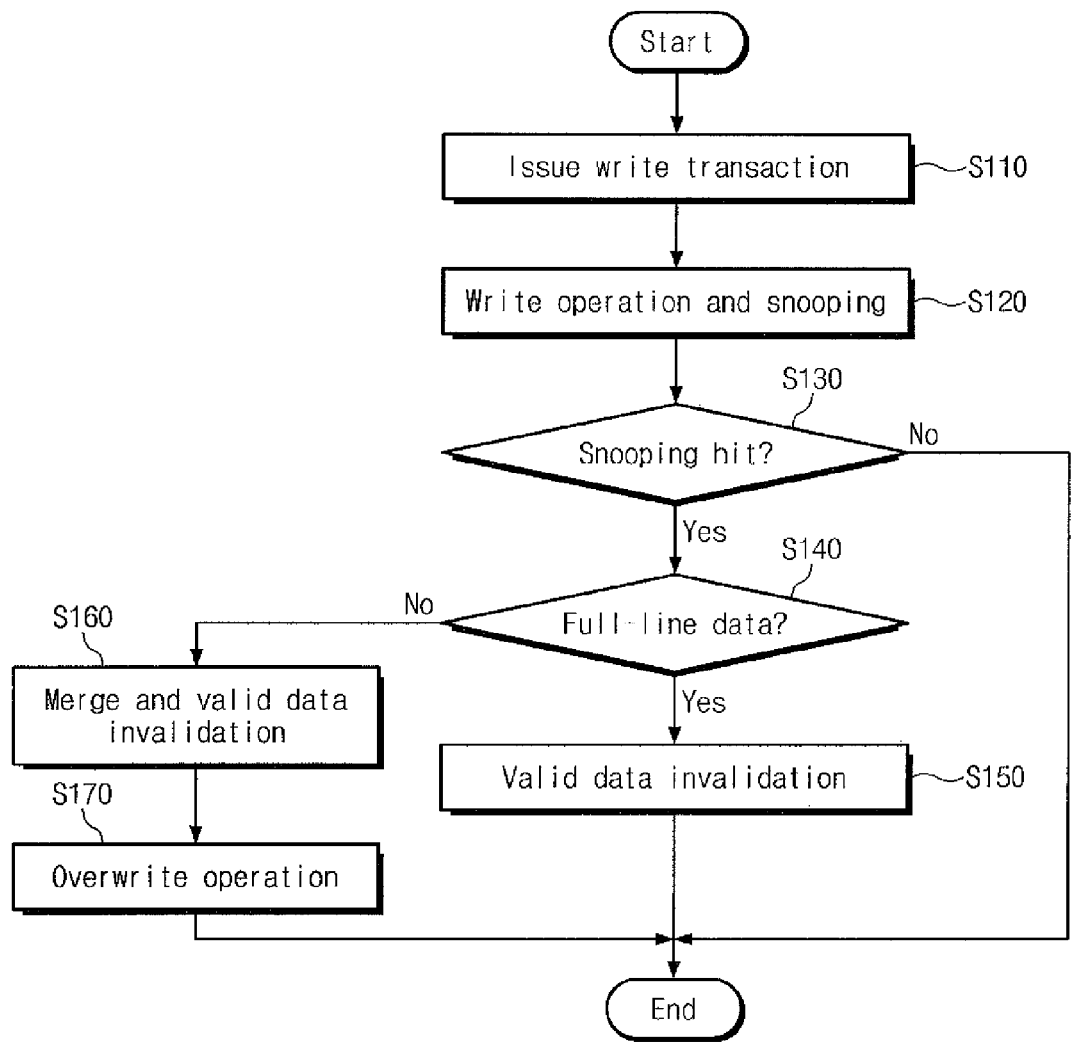
FIG. 3 is a flowchart illustrating a cache memory management method for a write transaction of a multiprocessor system according to an exemplary embodiment of the inventive concept.

Reference is made to FIG. 3, which is a flowchart illustrating a cache memory management method for a write transaction of a multiprocessor system according to an exemplary embodiment of the inventive concept. In an exemplary embodiment, valid data and write data are correlated with each other through an address.

As illustrated, the cache management method includes steps S110 to S170.

At step S110, a write transaction is issued. Let it be assumed that the write transaction is issued from the second master device 200. The issued write transaction may be transmitted to the system bus 140 through the second cache memory 121.

At step S120, write data is written into the slave device 150 and a snoop operation on another master device 110 is started. The master interface 142 of the system bus 140 grants an access right to the second master device 120. The master interface 142 controls write data corresponding to the write transaction to be written into the slave device 150. The snoop router 143 starts a snooping operation on master devices. For example, the snooping router 143 snoops the first cache memory 111 of the first master device permitted to be snooped. For example, the snoop router 143 determines whether there is valid data in the first cache memory 111.

The snooping operation of the snoop router 143 may be started prior to the step S120. Alternatively, the snooping operation of the snoop router 143 may be started following the step S120 and prior to step S130.

At the step S130, the snooping operation is terminated. When there is valid data in the first cache memory 111, it is determined to be a Snoop Hit. When there is no valid data in the first cache memory 111, it is determined to be Snoop Miss.

In case of the Snoop flit, the flow proceeds to step S140. In case of the Snoop Miss, the write transaction processing operation may be terminated.

At the step 140, it is determined whether the write data is full-line data. When the write data is full-line data, the flow proceeds to step S150. When the write data is partial-line data, the flow proceeds to step S160.

At the step S150, the valid data is invalidated. When the write data is full-line data, the snoop router 143 invalidates a corresponding cache line of a cache memory in which there is the valid data.

At the step S160, when the write data is partial-line data, the valid data and the write data are merged and the valid data is invalidated. For example, a part of a cache line corresponding to the valid data may be marked as invalid.

At the step S170, the merged data is overwritten into the slave device 150.

The cache memory management method of the multiprocessor system 100 is carried out through the foregoing steps S110 to S170. That is, except for the case where the write data is partial-line data, a write transaction processing operation may be terminated early. Thus, a write latency may be reduced.

Figure 4:
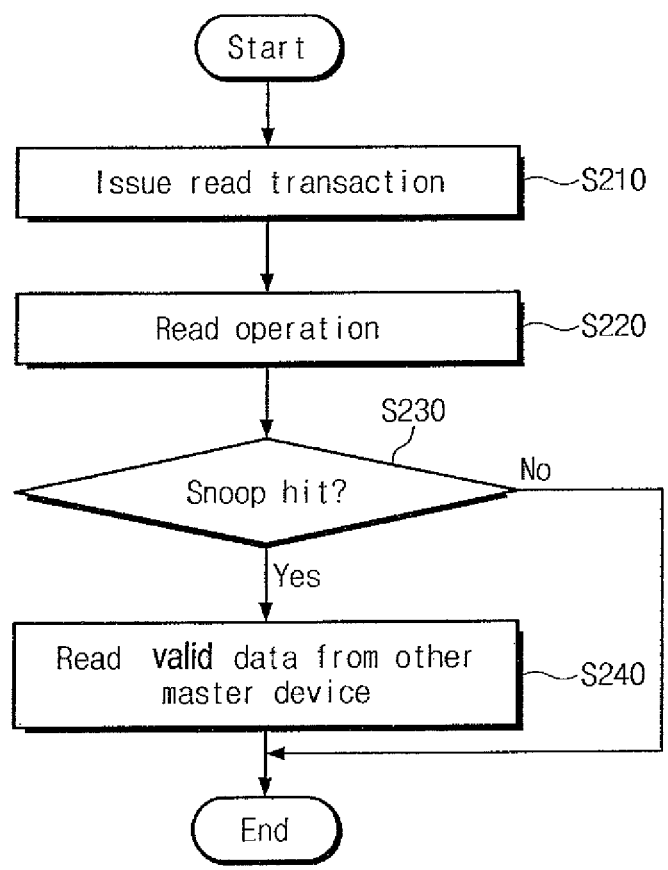
FIG. 4 is a flowchart illustrating a cache memory management method for a write transaction of a multiprocessor system according to an exemplary embodiment of the inventive concept.

FIG. 4 is a flowchart illustrating a cache memory management method for a write transaction of a multiprocessor system according to an exemplary embodiment of the inventive concept. Hereinafter, data corresponding to a read transaction will be referred to as read data.

As illustrated, the cache memory management method includes steps 5210 to S240.

At step S210, a read transaction is issued. Let it be assumed that the read transaction is issued from a second master device 120. The issued read transaction may be transmitted to a system bus 140 through a second cache memory 121.

At step S220, read data is read from a slave device 150 and a snooping operation is started on another master device 110. A master interface 142 of the system bus 140 grants an access right to the second master device 120. The master interface 142 controls read data to be read from a slave device 150. The snoop router 143 snoops a first cache memory 111 of the first master device 110 permitted to be snooped. For example, the snoop router 143 determines whether there is valid data in the first cache memory 111. The snooping operation of the snoop router 143 may be started prior to the step S220. Alternatively, the snooping operation of the snoop router 143 may be started following the step S220 and prior to step S230.

At the step S230, the snooping operation is terminated. When there is valid data in the first cache memory 111, it is determined to be a Snoop Hit. When there is no valid data in the first cache memory 111, it is determined to be a Snoop Miss. In case of the Snoop Hit, the flow proceeds to step S240. In case of the Snoop Miss, the read transaction processing operation may be terminated.

At the step S240, the second master device 120 may read the valid data of the first cache memory 111 of the first master device 110 through the system bus 140.

The cache memory management method of the multiprocessor system 100 is carried out through the foregoing steps S210 to S240. That is, read data corresponding to the read transaction may be read prior to termination of the snooping operation. In this case, a read latency may be reduced when a Snoop Miss is determined as a result of the snooping. Thus, a read latency of the multiprocessor system 100 may be reduced.

Figure 5:
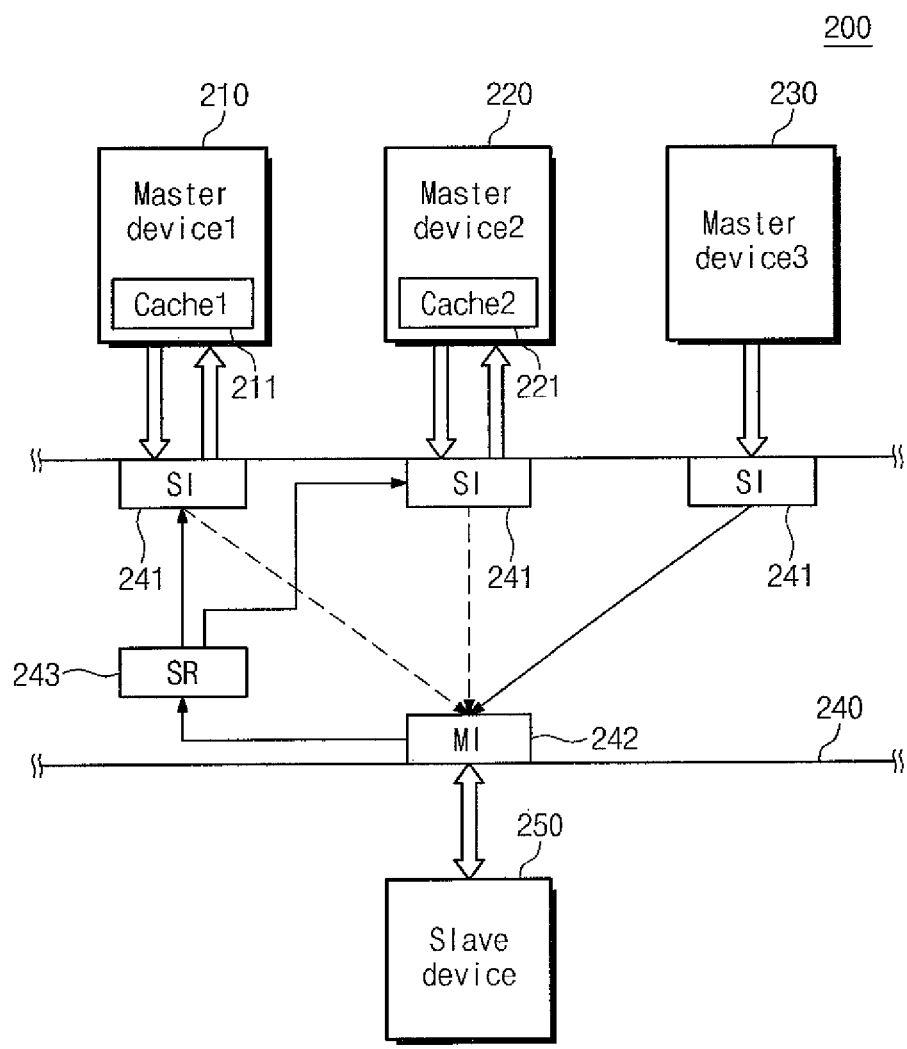
FIG. 5 is a block diagram of a multiprocessor system according to an exemplary embodiment of the inventive concept.

Reference is made to FIG. 5, which is a block diagram of a multiprocessor system 200 according to an exemplary embodiment of the inventive concept.

As illustrated, the multiprocessor system 200 includes a first master device 210, a second master device 220, a third master device 230, a system bus 240, and a slave device 250.

Let it be assumed that the first master device 210 and the second master device 220 may each snoop another master device and may each be snooped by another master device. Let it be assume that the third master device 230 cannot be snooped by the first master device 210 and the second master device 220. Further, let it be assumed that a write transaction is issued from the third master device 230.

The write transaction issued from the third master device 230 is transmitted to a corresponding slave interface 241. The slave interface 241 decodes an address of the slave device 250 and transmits the decoded address to a master interface 242. The master interface 242 grants an access right to the slave device 250 to the third master device 230. In addition, the master interface 242 writes write data corresponding to the write transaction into the slave device 250. A snoop router 243 snoops a first cache memory 211 and a second cache memory 221.

When the state is Snoop Hit and there are valid data in the first cache memory 211 and/or the second cache memory 221, the snoop router 243 invalidates all the valid data. In this case, the valid data stored in the first cache memory 211 and/or the second cache memory 221 may be all full-line data. This is because a cache memory stores data in units of cache lines.

According to the above-described embodiment, the write latency of the multiprocessor system 200 may be further reduced.

Figure 6:
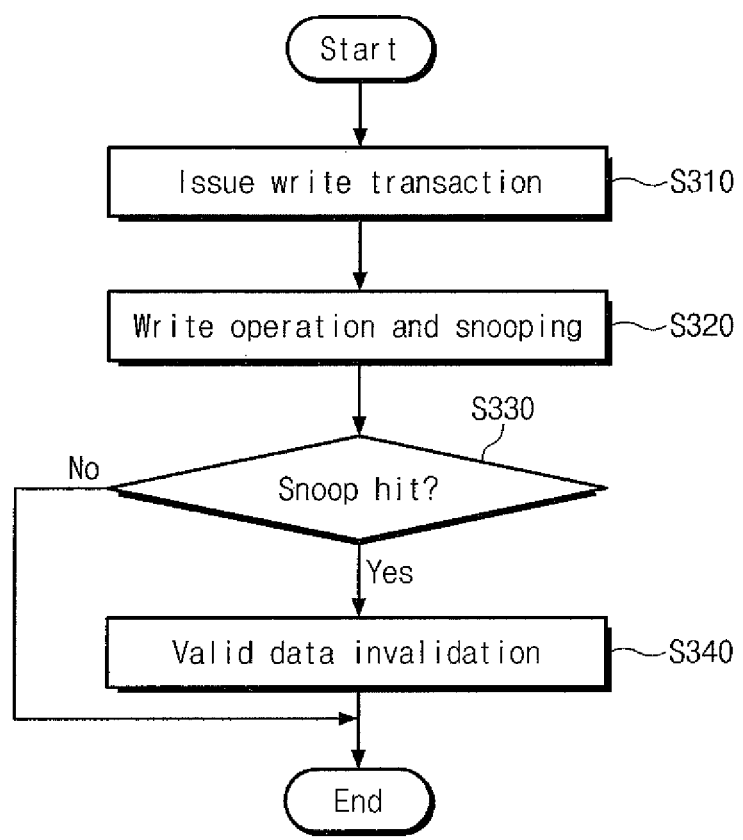
FIG. 6 is a flowchart illustrating a cache memory management method for a write transaction of a multiprocessor system according to the embodiment described in FIG. 5.

Reference is made to FIG. 6, which is a flowchart illustrating a cache memory management method for a write transaction of a multiprocessor system according to the embodiment described in FIG. 5.

As illustrated, the cache memory management method includes steps S310 to S340.

At step S310, a write transaction is issued.

At step S320, write data corresponding to the write transaction is written into a slave device 500 and a snooping operation is started on the first cache memory 211 of the first master device 210 and the second cache memory 221 of the second master device 220. For example, the master interface 242 of the system bus 240 grants an access right to a third master device 220. The master interface 242 may control write data corresponding to the write transaction to be written into a slave device 250. A snoop router 243 starts a snooping operation on master devices. For example, the snoop router 243 snoops the first cache memory 211 of the first master device 210 and the second cache memory 221 of the second master device 220. For example, the snoop router 243 determines whether there is valid data in the first cache memory 211 and the second cache memory 221.

The snooping operation of the snoop router 243 may be started prior to the step S320. Alternatively, the snooping operation of the snoop router 243 may be started following the step S320 and prior to step S330.

At the step S330, the snooping operation is terminated. When a snooping result is that at least one of the first and second cache memories 211 and 221 includes valid data, the flow proceeds to step S340.

At the step S340, valid data stored in the first cache memory 211 and/or the second cache memory 221 is invalidated.

When the snooping result is that both the first cache memory 211 and the second cache memory 221 do not include valid data, the write transaction processing operation is terminated.

Thus, according to the above embodiment, a read latency of the multiprocessor system 200 may be more reduced than in the embodiment described with reference to FIG. 3.

Figure 7:
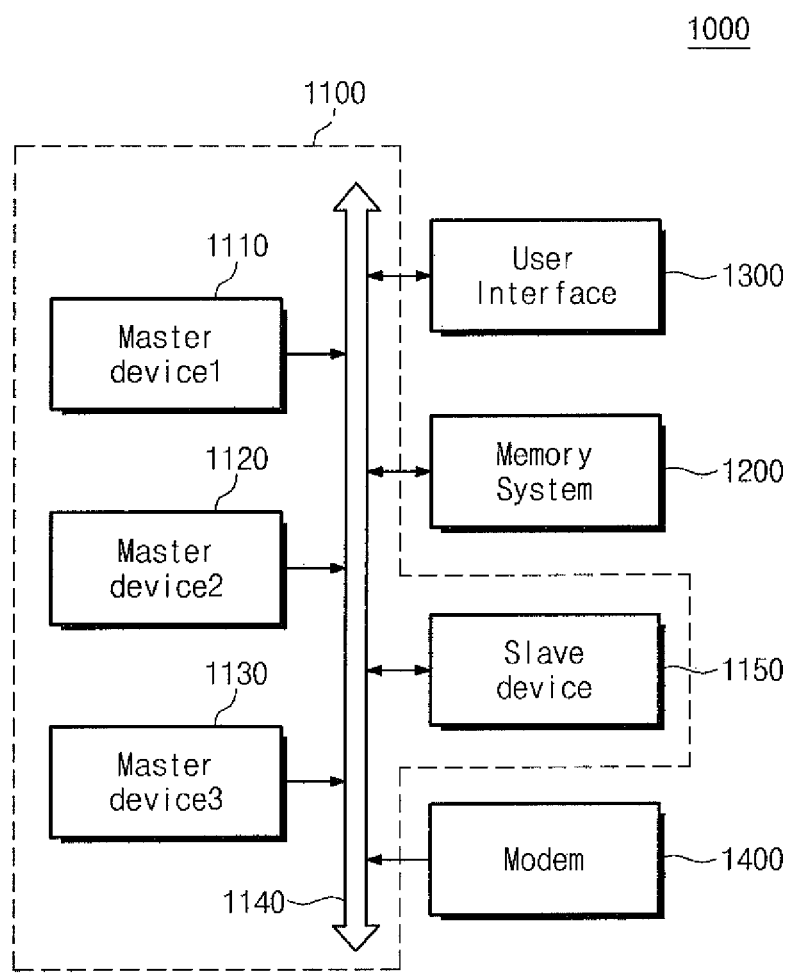
FIG. 7 is a block diagram of a computing system including a multiprocessor system according to an exemplary embodiment of the inventive concept.

Reference is made to FIG. 7, which is a block diagram of a computing system 1000 including a multiprocessor system according to an exemplary embodiment of the inventive concept. The computing system includes a multiprocessor system 1100, a memory system 1200, a user interface 1300, and a modem 1400 such as a baseband chipset.

If the computing system 1000 according to an embodiment of the inventive concept is a mobile device, a battery is additionally included to supply an operating voltage to the computing system. Although not illustrated in the drawings, at least one of an application chipset, a camera image processor (CIS), a mobile DRAM, etc. may be further included in the computing system 1000 according to an exemplary embodiment of the inventive concept.

The multiprocessor system 1100 includes a first master device 1110, a second master device 1120, a third master device 1130, a system bus 1140, and a slave device 1150. In addition, the multiprocessor system 1100 may include a memory system 1200, a user interface 1300, and a modem 1400 according to a system setting and a user environment. The slave device 1150 may be, for example, a main memory device such as a DRAM. The multiprocessor system 1100 is connected to the memory system 1200, the user interface 1300, and the modem 1400 through the system bus 1140.

As described above, the system bus 1140 of the multiprocessor system 1100 processes data corresponding to a transaction (e.g., write, read, etc.) when the transaction is issued from at least one of the first to third master devices 1110, 1120, and 1130 and then or simultaneously performs a snooping operation.

In an exemplary embodiment, the memory system 1200 is a solid-state drive/disk (SSD) that uses a nonvolatile memory to store data. Alternatively, the memory system 1200 may be a fusion flash memory (e.g., OneNAND flash memory).

According to at least one embodiment of the inventive concept described, cache coherence of a multi-processor system can be maintained. In addition, a write latency and/or a read latency of a multi-processor system can be reduced.

While the inventive concept has been particularly shown and described with reference to exemplary embodiments thereof, various changes in form and detail may be made therein without departing from the spirit and scope of the inventive concept.

What is claimed is:

1. A multiprocessor system comprising:
a plurality of master devices, wherein at least one of the master devices comprises at least one cache memory;
at least one slave device; and
a system bus configured to connect the master devices to the at least one slave device,
wherein the system bus grants an access right to the slave device to one of the master devices prior to termination of a snooping operation on the master devices.

2. The multiprocessor system as set forth in claim 1, wherein the system bus writes write data corresponding to a write transaction into the slave device while performing the snooping operation corresponding to the write transaction on the cache memory of the master devices.

3. The multiprocessor system as set forth in claim 1, wherein the system bus comprises:
a plurality of slave interfaces configured to receive a transaction from a corresponding one of the master devices and decode an address corresponding to the slave device;
a master interface configured to receive the transaction from the slave interface and grant the access right to the slave device to the one of the master devices; and
a snoop router configured to perform the snooping operation on the master devices, based on a snoop control signal received from the master interface.

4. The multiprocessor system as set forth in claim 3, wherein the transaction is a write transaction and the master interface writes write data corresponding to the write transaction into the slave device and transmits the snoop control signal to the snoop router.

5. The multiprocessor system as set forth in claim 3, wherein the transaction is a write transaction and the master interface writes write data corresponding to the write transaction into the slave device and then or simultaneously transmits the snoop control signal to the snoop router.

6. The multiprocessor system as set forth in claim 3, wherein the transaction is a write transaction, and wherein if there is valid data in the cache memory of a master device from which the transaction is not issued among the master devices, the snoop router invalidates the valid data when write data corresponding to the write transaction is full-line data, and merges the valid data with the write data and transmits the merged data to the master interface when the write data is partial-line data.

7. The multiprocessor system as set forth in claim 6, wherein the master interface overwrites the merged data into the slave device.

8. The multiprocessor system as set forth in claim 3, wherein the transaction is a write transaction, and wherein the snoop router terminates processing of the write transaction when there is no valid data in the cache memory of a master device from which the write transaction is not issued among the master devices.

9. The multiprocessor system as set forth in claim 1, wherein the system bus reads read data corresponding to a read transaction from the slave device and then or simultaneously performs the snooping operation corresponding to the read transaction on the master devices.

10. A method of managing a cache memory of a multiprocessor system comprising:
    issuing a transaction to a slave device of the system from at least one of a plurality of master devices of the system;
    granting, by a system bus of the system, an access right to the slave device to one of the master devices; and
    after the granting or while granting the access, snooping, by the system bus, the master device from which the transaction is not issued among the master devices.

11. The method as set forth in claim 10, wherein the transaction is a write transaction, and wherein the processing of the data write request writes write data from the write transaction into the slave device.

12. The method as set forth in claim 11, wherein the snooping of the master device determines whether valid data is present in the corresponding master device.

13. The method as set forth in claim 12, further comprising:
    determining whether the write data is full-line data or partial-line data when the valid data is present.

14. The method as set forth in claim 13, further comprising:
    invalidating the valid data when the write data is full-line data;
    merging the write data with the valid data when the valid data is partial-line data; and
    overwriting merged data obtained by merging the write data and the valid data and invalidating the valid data.

15. The cache memory management method as set forth in claim 10, wherein the transaction is a read transaction, and wherein the processing of the data read request reads read data corresponding to the read transaction from the slave device.

16. A method of managing a cache memory of a system by a system bus of the system, the method comprising:
    receiving by the system bus, a write request from a first master device of the system;
    granting by the system bus, access to write first data of the write request to the slave device;
    after the granting or while granting the access, determining by the system bus, whether second data corresponding to the first data is present within the cache memory of a second master device of the system; and
    marking by the system bus, the present data in the cache memory as invalid.

17. The method of claim 16, wherein the second data corresponding to the first data is present when an address of the write request is the same as an address in the cache memory associated with the second data.

18. The method of claim 16, wherein the marking comprises:
    marking an entire cache line of the cache memory corresponding to the second data invalid when the first data is a size of a cache line of the cache memory; and
    merging the second data with the first data and marking only a portion of a cache line of the cache memory corresponding to the second data invalid when the first data is smaller than the cache line.

19. The method of claim 18, further comprising overwriting by the system bus, data of the slave device with the merged data.

20. The method of claim 16, the marking comprises changing a value of a register in the second master device associated with the present data.

* * * * *